United States Patent
Kuller et al.

(10) Patent No.: US 7,056,410 B2
(45) Date of Patent: Jun. 6, 2006

(54) ROLL-FED TAPE/FILM SYSTEM FOR APPLICATION OF ADHESIVE TO VARIOUS MEDIA IN INKJET PRINTING DEVICES

(75) Inventors: Rachel Kuller, Vancouver, WA (US); Suk Wong, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 10/020,675

(22) Filed: Oct. 30, 2001

(65) Prior Publication Data

US 2003/0079830 A1 May 1, 2003

(51) Int. Cl.
- *B32B 37/12* (2006.01)
- *B32B 38/10* (2006.01)
- *B32B 38/14* (2006.01)
- *B32B 43/00* (2006.01)

(52) U.S. Cl. .................. 156/277; 156/238; 156/387; 156/388

(58) Field of Classification Search ............ 156/277, 156/384, 385, 386, 387, 388, 578, 230, 231, 156/238; 427/207.1, 208.2, 208.4, 208.6
See application file for complete search history.

(56) References Cited

U.S. PATENT DOCUMENTS

| | | | | |
|---|---|---|---|---|
| 3,843,480 A | * | 10/1974 | Dreher | 428/354 |
| 3,869,328 A | * | 3/1975 | Instance | |
| 4,240,862 A | * | 12/1980 | Ishiyama | 156/350 |
| 4,359,358 A | * | 11/1982 | Hattemer | 156/248 |
| 4,501,772 A | * | 2/1985 | Luxeder | |
| 4,927,278 A | | 5/1990 | Kuzuya et al. | |
| 4,960,482 A | * | 10/1990 | Crane et al. | 156/277 |
| 5,075,721 A | * | 12/1991 | Paulsel et al. | 355/72 |
| 5,210,581 A | * | 5/1993 | Kuzuya | 355/405 |
| 5,222,818 A | * | 6/1993 | Akiyama et al. | 400/61 |
| 5,224,786 A | * | 7/1993 | Takagi et al. | 400/621 |
| 5,405,475 A | * | 4/1995 | Kraft et al. | 156/275.5 |
| 5,609,716 A | * | 3/1997 | Mosher, Jr. | 156/384 X |
| 5,707,475 A | * | 1/1998 | Steidinger et al. | 156/257 |
| 5,904,108 A | * | 5/1999 | Tanaka et al. | 112/102.5 |
| 6,037,042 A | * | 3/2000 | Kato et al. | |
| 6,153,289 A | * | 11/2000 | Murray | 428/201 |
| 6,190,065 B1 | * | 2/2001 | Brzuskiewicz | 400/120.01 |
| 6,228,451 B1 | * | 5/2001 | Boudouris et al. | 428/40.1 |
| 6,270,612 B1 | * | 8/2001 | Bradshaw | 156/234 |
| 6,462,765 B1 | * | 10/2002 | Conwell et al. | 347/171 |
| 2002/0162502 A1 | * | 11/2002 | Silverbrook | |

OTHER PUBLICATIONS

IBM Technical Disclosure Bulletin, "Document Binding System," vol. 26, Issue 7A, Dec. 1, 1983, pp. 3529-3531.*

* cited by examiner

*Primary Examiner*—Melvin Mayes

(57) ABSTRACT

Conventional media receives print imaging and an adhesive during a printing operation thereby converting such conventional media into a label, i.e., media having print imaging and an adhesive for application to a contact or display surface. Print imaging is applied in conventional fashion. Adhesive is applied as taken from a reel-form stock including in various embodiments and configurations protective backing sheets and the like supporting application of adhesive to media to produce as output labels on arbitrarily selected media. As a result, users produce labels from arbitrary media and need not limit selection to commercially available label-making media.

5 Claims, 4 Drawing Sheets

ROLL-FED TAPE/FILM SYSTEM FOR APPLICATION OF ADHESIVE TO VARIOUS MEDIA IN INKJET PRINTING DEVICES

BACKGROUND OF THE INVENTION

The present invention relates generally printing methods and apparatus, and particularly to printing methods and apparatus producing printed label media bearing an adhesive for application to a contact or display surface.

While most printing operations involve application of print imaging, e.g., graphics and text, to simple sheet-form media, some printing operations involve production of labels. Generally, a label bears print imaging as applied in a printing operation and also includes an adhesive on at least one side of the resulting printed media. Labels are often used for addressing, e.g., an address is printed on the label and the adhesive portion of the label allows one to adhere the label to a package for introduction into the postal or other delivery system. Other examples of printing operations producing labels include production of bar code indicia and informational or identification tag labeling such as for application to articles, e.g., a variety of items such as desk drawers, boxes, packages, and the like, wherein content of a given article or the character of the article itself may be indicated by label attached by adhesive thereto.

One popular method of producing labels is by label sheets. A sheet-form media including a waxy back sheet and an array of adhesive labels attached thereto feeds through a printing device. The printing device applies print imaging to one or more of the labels. Once ejected from the printing device, individual labels may be peeled from the waxy back sheet and applied to a contact or display surface as desired. Typically, the labels have on a front side print imaging as applied by the printing device and on the back side an adhesive adhering the label to a contact or display surface. A variety of other label-making methods and apparatus have evolved. These label-making printing operations share, however, a common characteristic of a label having incorporated therewith an adhesive on at least one surface prior to application of print imaging. Thus, specialized label media as so configured, i.e., with an adhesive surface integral therewith, feed into a printing device.

In some cases, specialized printing devices have been proposed for production of special-form labels. For example, U.S. Pat. No. 4,927,278 issued May 22, 1990 and entitled Tape Cassette And Tape Printer For Use Therewith shows a specialized tape printer which joins together an image receiving tape and an adhesive tape following application of imaging by ink ribbon to the image receiving tape. The ink ribbon, image receiving tape, and adhesive tape are held in a cassette which mounts to a tape printer. The image is applied to the image receiving tape and the adhesive is then applied thereover. After printing, the tape is fed out together with the adhesive tape applied to the printing surface of the image receiving tape. Unfortunately, this printer severely restricts the available media which may be used in production of labels. More particularly, this is a dedicated, specialized type of media. The user has no opportunity to select an arbitrary media for production of labels.

As a result, media suitable for production of labels is limited. In other words, media supporting label-making printing operations is special media typically having the above-noted characteristic of a waxy back sheet protecting an adhesive integrally formed with the label media and allowing passage thereof through a printing device. Such label-making media is generally more expensive than conventional printing media. Users wishing to produce labels must select from a limited set of commercially available label-making media. Users do not have opportunity to produce labels from arbitrarily selected media, i.e., cannot select for label-making purposes any media suitable for printing, but must select only media specifically manufactured for label-making printing operations.

It would be desirable, therefore, to allow users to produce labels from arbitrary media, i.e., from any selected media suitable for application of print imaging thereon.

SUMMARY OF THE INVENTION

In accordance with the present invention, a method of producing a label includes the steps of selecting a media, the media having a first side and a second side, feeding the media into a printing device, applying print imaging to a selected one of the first and second sides, and applying adhesive to a selected one of the first and second sides. As a result, conventional media, i.e., not originally intended for use as a label, converts under the present invention into an adhesive bearing label including print imaging thereon.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The present invention contemplates, for example, an inkjet printing device allowing application of an adhesive to arbitrary media thereby converting arbitrary media to an adhesive-bearing printed output capable serving as a label, i.e., capable of adhering to a selected contact or display surface. This expands the range of available label-making media well beyond commercially available media dedicated specifically to label-making; and thereby expands greatly the opportunity to select media for particular uses according to a desired label-making printing operation without limitation to media specifically designed for label-making operations. This enables small business and personal printing operations to create self-adhering documents usable in a wide range of applications. Examples include posting flyers, posting notes, creating greeting cards, securing photos into scrapbooks, creating personalized self-adhesive notes, creating name tags, and the like. By allowing the user to add an adhesive during the printing process the user enjoys flexibility in media choice, sizes, and shapes well beyond that presently available in the limited set of media designed specifically for label-making operations.

Figure 1:
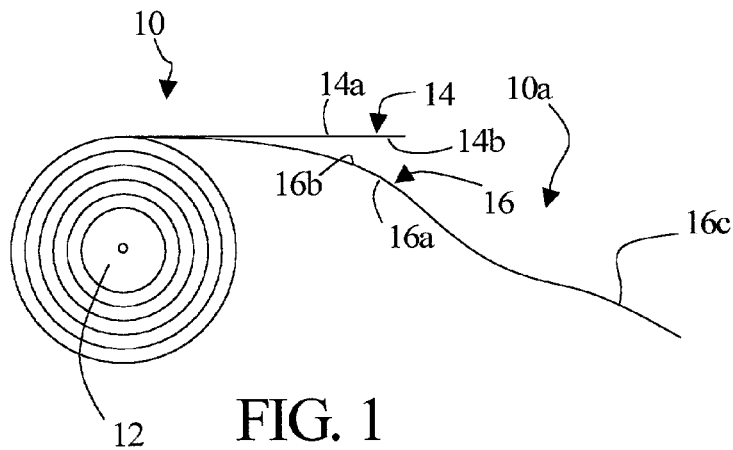
FIG. 1 illustrates in side view a reel-form adhesive tape applicable to label-making printing operations under the present invention.
Figure 2:
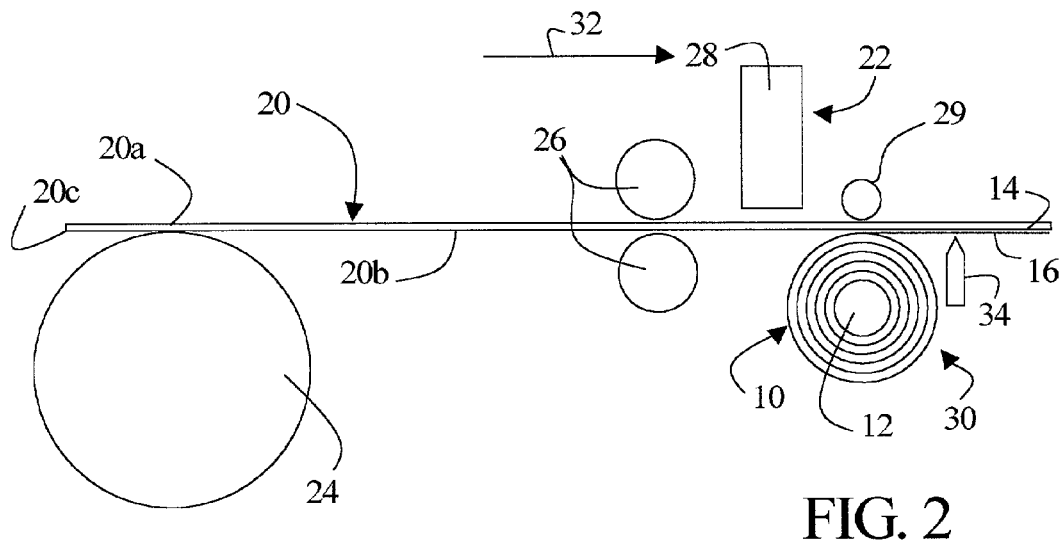
FIG. 2 illustrates schematically a printing device making use of the tape of FIG. 1 according to a first embodiment of the present invention.

FIG. 1 illustrates schematically and in side view a two-sided adhesive tape 10 proposed for use under one embodiment of the present invention. In FIG. 1, tape 10 comes in reel-form on a spool 12. Spool 12 is placed into a spool holder (not shown in FIG. 1) located in a printer. The spool holder has a central axis concentric width that of spool 12 as shown in FIG. 2. Tape 10 is illustrated in FIG. 1 with its distal end 10a separated to show the various components thereof. Tape 10 includes a substrate 14 bearing on an upper surface thereof an adhesive coating 14a and on a lower surface an adhesive coating 14b. In other words, substrate 14 is a double-sided adhesive tape. A backing sheet 16 lies against lower adhesive coating 14b. When wrapped around spool 12, upper adhesive coating 14a lies against the lower-facing surface 16a of backing sheet 16. The upper surface 16b of backing sheet 16 lies in contact with the lower adhesive coating 14b. As provided on spool 12, therefore, tape 10 enjoys protection against inadvertent contact with adhesive coatings 14a and 14b by virtue of backing sheet 16 therebetween. Backing sheet 16 includes a leader 16c extending beyond the distal end of substrate 14. Leader 16c wraps about the exterior of tape 10 as provided on spool 12 to protect adhesive coating 14a against inadvertent contact prior to use of tape 10, i.e., as packaged for distribution and prior to use. As may be appreciated, backing sheet 16 is a waxy material adapted for light adhesion to coatings 14a and 14b, but easily separated therefrom without degrading the adhesive function of coatings 14a and 14b. As deployed from spool 12, backing sheet 16 remains in contact with the lower adhesive coating 14b of tape 14. The upper adhesive coating 14a, however, is exposed upon deployment of tape 10 from spool 12.

FIG. 2 illustrates schematically a printer 22 making use of tape 10 during a label-making printing operation. In FIG. 2, sheet-form media 20 moves through printer 22. A pick roller 24 collects individual media 20 from, for example, an input tray (not shown) and delivers media 20 to feed rollers 26. An inkjet print head 28 lies along a feed path established by feed rollers 26 and applies print imaging to an upper surface 20a of media 20. An adhesive station 30 carries spool 12 and deploys therefrom tape 10. More particularly, station 30 deploys tape 10 from spool 12 in the media transport direction 32. Upper adhesive coating 14a is exposed to the lower surface 20b of media 20. As media 20, at its lower surface 20b, comes into contact with upper adhesive coating 14a, tape 10 adheres to media 20 at lower surface 20b thereof. Media 20 velocity must be such that any print imaging on media 20 has opportunity to dry sufficiently to avoid smudging by contact prior to reaching roller 29. A pinch drive roller 29 bears against the upper surface 20a of media 20 and captures therebelow tape 16 to better adhere tape 16 to media 20, i.e., to insure full, even contact between the adhesive coating 14a and lower surface 20b of media 20. It is suggested that spool 12 be upwardly biased to keep coating 14a in contact with media 20 as the supply of tape 10 diminishes and, therefore, the diameter of material carried on spool 12 diminishes. For example, spool 12 may be supported at the distal end of a lever arm pivotally mounted at its proximal end. Spring biasing upward towards media 20 maintains roll 10 in contact with the lower-facing surface 20b of media 20 and thereby completes in combination with roller 29 coupling therebetween. Biasing may be intermittently actuated to achieve selective application of adhesive 14a as a function of a driver-based user input or the mechanical sensing of a leading or trailing edge of media 20. In other words, spool 12 may be controllably brought out of position for contact with media 20 and thereby disable application of adhesive 14a thereto. Application of adhesive 14a is enabled, therefore, by returning spool 12 to its media engaging position with biasing applied to fully engage media 20. As media 20 continues in the feed path direction 32, it pulls tape 10 from spool 12. Adhesive coating 14a thereby adheres to the lower surface 20b of media 20.

Eventually, media 20 moves past station 30 and its trailing edge 20c halts, as under suitable control circuitry and programming, at a cutter 34. A user of printer 22 grasps media 20 and tears away tape 10 at cutter 34. In other words, the user severs or tears away a distal segment of tape 10 at station 30, the segment being that portion of tape 10 adhering to lower surface 20b of media 20. In the alternative, an automated cutter may be employed which moves across the combined structure of media 20 and tape 16 to automatically sever at an appropriate point tape 10. The resulting product is a sheet-form media 20 having on its upper surface 20a selected print imaging and on its lower surface 20b a segment of tape 10. As may be appreciated, the backing sheet 16 remains in place and protects lower adhesive coating 14b against inadvertent contact with other media 20 or other surfaces. In other words, a set of such media 20 can be stacked one on top of another with the backing sheets 16 in place therebetween to prevent undesired adhesion. Once a suitable contact or display surface is selected for placement of media 20, backing sheet 16 is pulled from the resulting label, i.e., from media 20 as bearing a segment of tape 10 thereon, thereby exposing lower adhesive coating 14b for adhering to the selected contact surface.

Thus, a user of printer 22 has the option of selecting an arbitrary media 20 capable of feeding through printer 22, and mounting a segment of tape 10 on its lower side 20b. The user thereby converts conventional media 20 into a label with print imaging on one side and an adhesive coating on the other.

Figure 3:
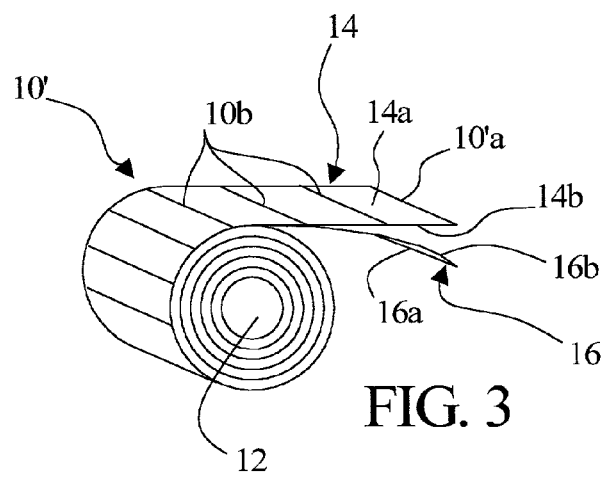
FIG. 3 illustrates an alternative form of adhesive tape as applicable under the present invention.

FIG. 3 illustrates first alternative tape 10' including pre-defined or precut sections. In FIG. 3, tape 10' is illustrated with its distal end 10a' separated to show components thereof Tape 10' includes a substrate 14 and backing sheet 16 similar to that of tape 10. In other words, substrate 14 is a double-sided adhesive having an upper adhesive coating 14a and a lower adhesive coating 14b. Backing sheet 16 includes a lower-facing surface 16a and an upper-facing surface 16b. Tape 10' differs from tape 10, however, in use of lateral perforations 10b distributed along the length of tape 10. Perforations 10b are cut through both substrate 14 and backing sheet 16 whereby a user tears tape 10 along a selected perforation 10b to separate a segment of tape 10' from the remaining tape 10' on spool 12. Thus, use of tape 10' eliminates need for a cutter 34 in printer 22. More particularly, the user tears tape 10' at a selected perforation 10b as desired when removing media 20 from printer 22.

Thus, printer 22 operates as described above transporting media 20 through printer 22 and capturing a segment of tape 10' against the lower surface 20b of media 20. When print imaging is complete, the user tears the distal segment of tape 10' from printer 20 along with media 20 as attached thereto during the printing operation.

Figure 4A:
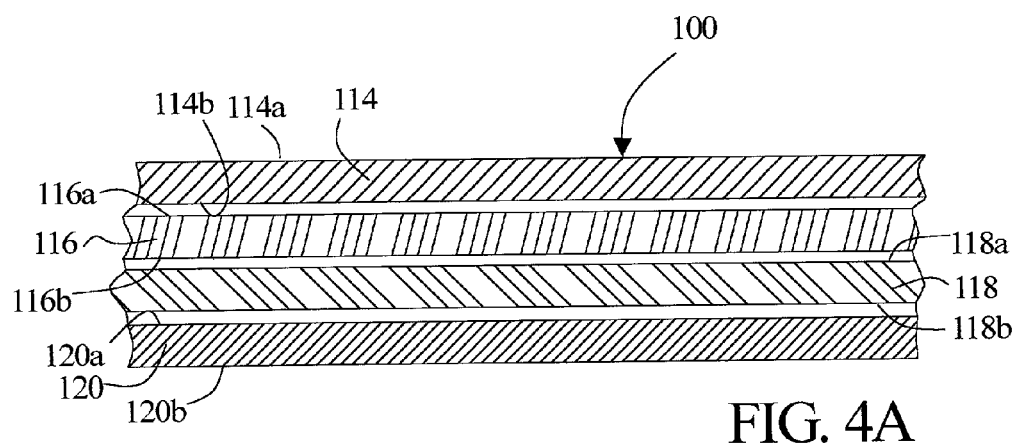
FIGS. 4A–4C illustrates a third form of adhesive tape with variations thereof as applicable under the present invention.

FIG. 4A illustrates in side view the layers of a third alternative tape 100. In FIG. 4, a segment of tape 100 is illustrated in side view and in exaggerated proportion with slight separation between layers to better illustrate the various components thereof. It will be understood, however, that tape 100 is provided in reel-form on a spool 12 as discussed above in relation to tape 10 and tape 10'. Tape 100 includes four separate layers. The upper layer, as viewed in FIG. 4A, is an adhesive film 114. Film 114 includes an upper-facing surface 114a and a lower-facing surface 114b. A backing sheet 116 engages at its upper-facing surface 116a the lower-facing surface 114b of adhesive film 114. A second adhesive film 118, including an upper-facing surface 118a and a lower-facing surface 118b, lies just below backing sheet 116 with its upper-facing surface 118a engaging the lower-facing surface 116b of sheet 116. Finally, a carrier 120 lies as the lower-most layer as viewed in FIG. 4A with its upper-facing surface 120a contacting the lower-facing surface 118b of adhesive film 118. The lower-facing surface 120b of carrier 120 engages the upper-facing surface 114a of adhesive film 114 when tape 100 is wrapped about a spool 12.

Figure 4B:
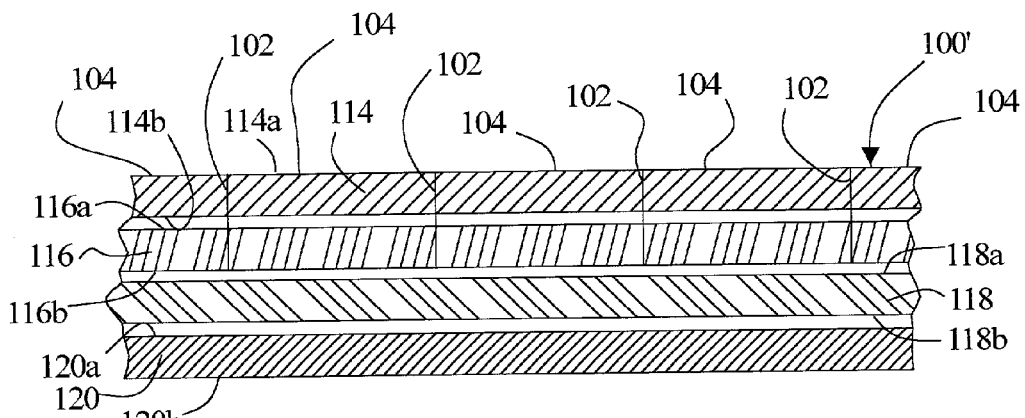
Figure 4C:
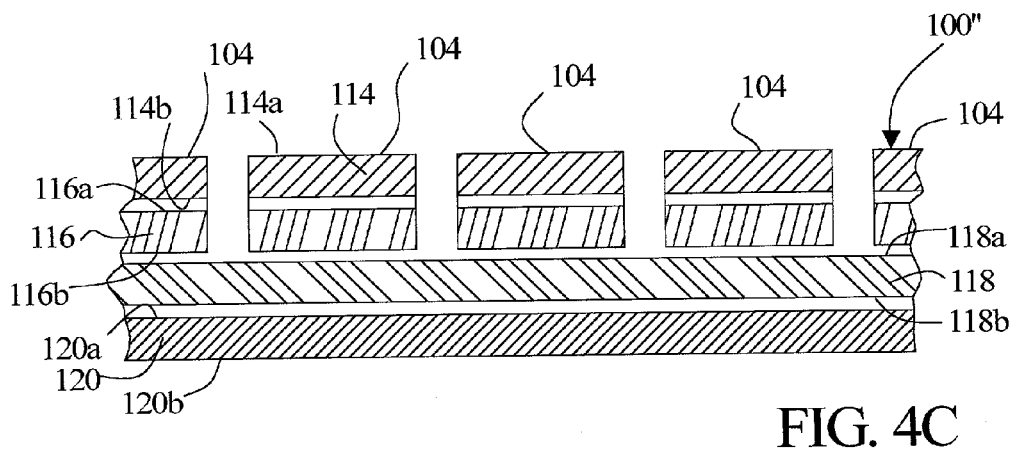

Tape 100 as illustrated in FIG. 4A may be varied according to particular implementations of the presented invention. More particularly, tape 100 may be provided with predefined segments similar to tape 10', but complete cuts 102 to enable automated separation of tape 100. More particularly, FIG. 4B illustrates use of adjacent precut sections 104 and FIG. 4C illustrates use of nonadjacent precut sections 104. In FIGS. 4B and 4C, adhesive film 114 and backing sheet 116 are precut to define distinct sections thereof. Adhesive film 118 and carrier 120, however, are continuous and thereby support continuous printing operations as described more fully hereafter. With reference specifically to FIG. 4B, tape 100' includes a series of lateral cuts 102 distributed along its length and extending through adhesive film 114 and backing sheet 116. Cuts 102 are complete, i.e., not perforations. During a printing operation, cuts 102 define a series of segments 104, each including the combined layers 114 and 116. Because cuts 102 are complete, sections 104 when coupled to media remain attached thereto. A given segment of tape 100', i.e., comprising one or more sections 104, naturally adheres to a media without requiring use of a cutter and without requiring user intervention, i.e., user tearing away a portion of tape 100 for each media printed.

FIG. 4C illustrates tape 100" having nonadjacent sections 104. In this embodiment of tape 100, cuts 102 are in essence much wider and defined open space between segments 104. Greater separation between sections 104 facilitates better deployment of sections 104 onto media as described herein. For example, sections 104 will be less likely to hang together and therefore better separate from one another as necessary upon application to media 20.

As described more fully hereafter, tape 100' or 100", collectively referenced as tape 100, moves from a first spool 12b (FIG. 5) to a second spool 12a (FIG. 5) during a label-making printing operation. As tape 100 wraps around the second spool, however, adhesive film 114 and backing 116 split away from adhesive film 118 and carrier 120. The upper-facing surface 114a of adhesive film 114 contacts and adheres to a media sheet and carries therewith the backing sheet 116. More particularly, those sections 104 contacting media remain adhered to media and are carried away thereby. Some sections 104 may not engage media, i.e., corresponding to gaps between media moving along the feed path of printer 122, are simply carried away by adhesive films 118 and carrier 120. Adhesive film 118 and carrier 120, as well as unused sections 104, collect about the second spool. Thus, the function of adhesive film 114 is to adhere to a media sheet as contiguous sections 104, thereby converting a conventional media sheet into a label, and also to carry the protective backing sheet 116. Once a contact or display surface is selected, backing sheet 116 is removed and the media attached thereto by means of adhesive film 114. The function of adhesive film 118, however, is to carry the combined adhesive film 114 and backing sheet 116 on the carrier 120.

Figure 5:
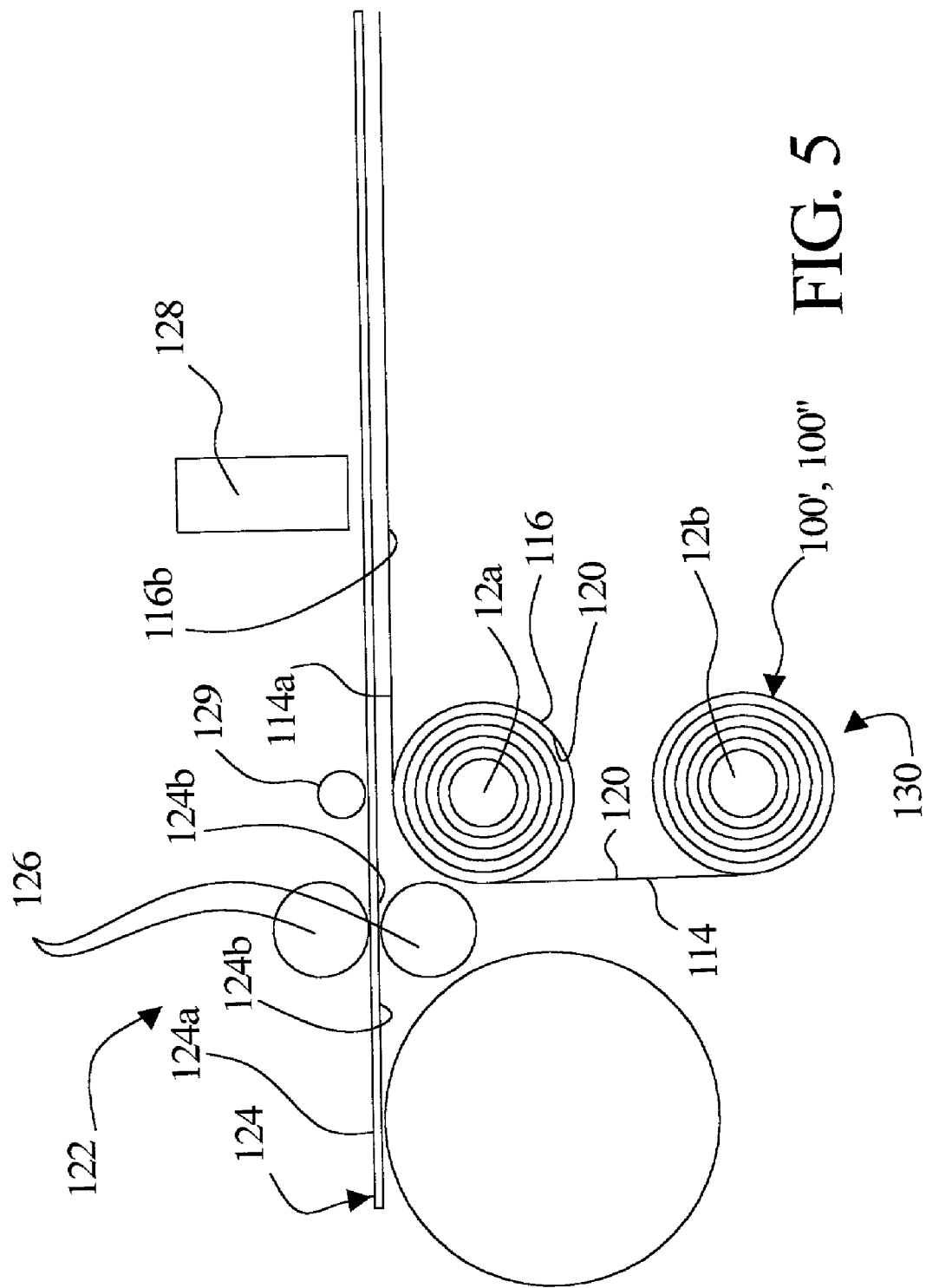
FIG. 5 illustrates schematically a printing device making use of the tape of FIG. 4 in accordance with the present invention.

FIG. 5 illustrates schematically a printer 122 making use of tape 100 to convert a conventional media 124 into a label. In FIG. 5, media 124 passes adhesive station 130. Adhesive station 130 includes a first spool 12a and second spool 12b. Tape 100 originates on spool 12b and deploys therefrom onto spool 12a and onto media 124. More particularly, as media 124 passes spool 12a, the upper-facing surface 114a of adhesive film 114 is exposed and contacts the lower-facing surface 124b of media 124. A pinch roller 129 presses against the upper-facing surface 124a of media 124 and established good adhesion between the upper-facing surface 114a of film 114 and the lower-facing surface 124b of media 124. As with printer 22, it is suggested that spool 12a be biased upward and against pinch roller 129 to maintain good contact between adhesive surface 114a and media surface 124b. Media 124 then carries with it both adhesive film 114 and backing sheet 116 as contiguous sections 104. In other words, tape 100 splits at adhesive station 130 with a first portion, i.e., adhesive film 114 and backing sheet 116, being carried away in sections 104 on media 124 and a second portion, i.e., adhesive film 118, carrier 120 and unused sections 104, being taken up on spool 12a.

Printer 122 further includes a print head 128 and feed rollers 126 according to conventional printing methods and structures. Print head 128 applies print imaging to the upper-facing surface 124a of media 124. Feed rollers 126 propel media 124 suitably through printer 122. The resulting output of printer 122 is an arbitrary media 124, i.e., a media not originally designed for use as a label, converted into an adhesive label, i.e., a media having both selected print imaging as applied in a printing process by printer 122 and an adhesive film 114.

Figure 6:
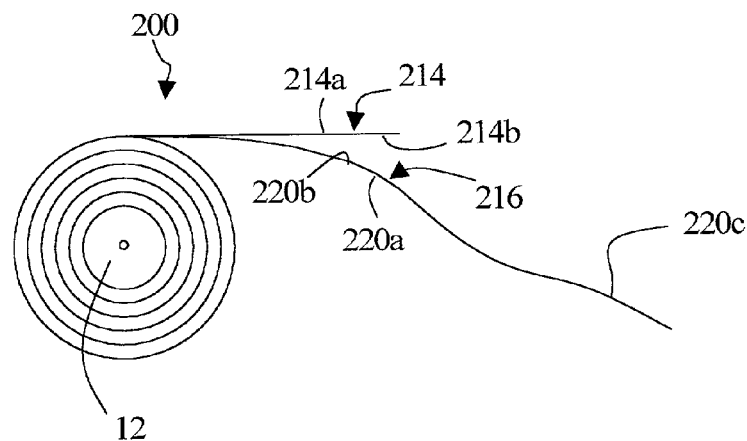
FIG. 6 illustrates schematically a fourth form of adhesive tape as applicable under the present invention.

FIG. 6 illustrates a third alternative tape 200. In FIG. 6, tape 200 includes two components, an adhesive film 214 and a carrier 220. Tape 200 is similar to tape 10 in that film 214 includes an upper-facing adhesive 214a and a lower-facing adhesive 214b. Carrier 220 includes an upper-facing surface 220b contacting lower-facing surface 214b of film 214 and has a lower-facing surface 220a. A leader 220c extends beyond the end of film 214. Thus, tape 200 may be provided on a spool 12 with leader 220c wrapped about the exterior outward-facing surface 214a as provided prior to use. Generally, in use tape 200 automatically adheres to a selected media during a print imaging process. In this case, however, the resulting output includes a selected media including print imaging on one side and the adhesive film 214 on the other side. Thus, use of tape 200 under one aspect of the present invention contemplates output not including the carrier 220. In other words, when output from printer 122' (FIG. 7), adhesive surface 214b is exposed and ready for use, i.e., ready for adhesion to a selected contact or display surface.

Figure 7:
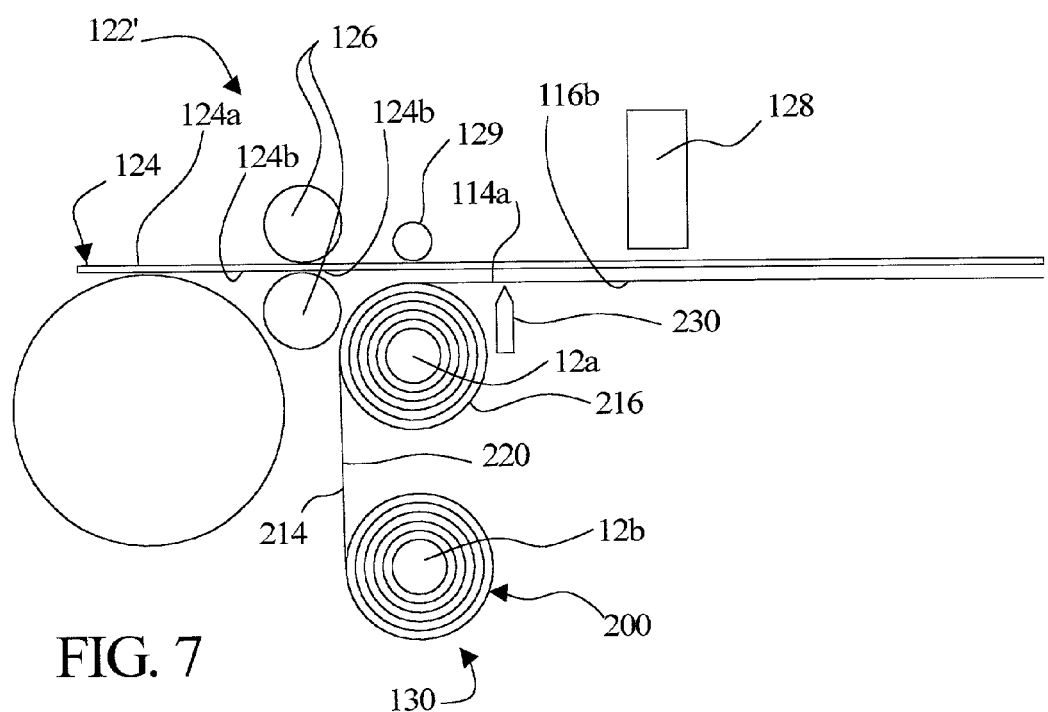
FIG. 7 illustrates schematically a printing device making use of the tape of FIG. 6 in accordance with the present invention.

FIG. 7 illustrates schematically mechanical features of a printing device making use of the tape 200 of FIG. 6. In FIG. 7, printer 122' is similar to printer 122 of FIG. 5 but includes also a cutter 230. Generally, tape 200 originates at spool 12b at adhesive station 130. As media 124 passes station 130, tape 200 engages at surface 214a the lower-facing surface 124b of media 124. Upwardly biasing spool 12a of station 130 maintains good contact between adhesive surface 114a and media surface 124b. As such, media 124 carries away film 214, but carrier 220 collects on spool 12a. Thus, as printer 122a ejects media 124 therefrom, media 124 carries thereon film 214 with adhesive surface 214b exposed and ready for adhesion to a selected contact or display surface.

Selecting the relative degree of adhesion provided by film 214 allows stacking of media 124 including film 214 attached thereto. More particularly, the degree of adhesion between adhesive surface 214a and lower-facing surface 124b of media 124 should be very strong. The degree of adhesion between adhesive surface 214b and media 124, specifically, upward-facing surface 124a thereof, should be less. In other words, by establishing a relatively smaller degree of adhesion between surface 214b and surface 124a, a stack of media 124 including film 214 may be organized and separated without separating individual media 124 from the associated film 214. In this manner, media 124 may stack in the output tray of printer 122' without user intervention. As such, resulting output, i.e., adhesive-bearing labels, may be used as "sticky notes" or other such non-permanent labeling applications. Otherwise, i.e., with relatively stronger adhesion available at surface 214b, user intervention may be employed as each media 124 ejects from printer 122'. In either case, cutter 230 severs film 214 at the trailing edge of media 124 upon ejection from printer 122'.

It is understood that while the embodiments illustrated herein are shown in side view without illustrating the width of a particular media or adhesive film attached thereto during a printing process, a given implementation may include adhesive having width corresponding to or less than a given media width. Furthermore, the length dimension of adhesive film may be equal to or less than the corresponding length dimension of media attached thereto. Thus, a user may use adhesive film of various widths under the present invention. Sensors within the various printers described herein may be employed to locate the leading and rear edges of media 20 as media 20 passes therethrough. Spools 12a and 12b can be driven to control and locate adhesive to prevent application of adhesive film beyond the edges of media 20. Furthermore, sections 104 as described herein may be of sufficiently small dimension in the feed direction so as to minimize any registration issues which may arise, i.e., registration of the leading or trailing edges of adhesive film relative to the leading or trailing edges of media. Thus, controllably biasing a spool bearing adhesive as described herein in combination with media edge detection will support segmented adhesive registration relative to media edges.

Thus, improvements in label making methods and apparatus have been shown and described. The present invention permits use of conventional media to produce labels. In other words, media not originally intended for use as labels may be used as labels under the present invention. In this regard, a user has opportunity to select media from a range of given media sizes, i.e., media sizes which may be fed through the printer adapted in accordance the present invention. Users may apply conventional sheet-form media such as standard paper sizes or standard card stock sizes such as are often selectable as media for print imaging, but heretofore not selectable as label-making media. As a result, a user has a broader spectrum of choices available for label media under the present invention.

It will be appreciated that the present invention is not restricted to the particular embodiment that has been described and illustrated, and that variations may be made therein without departing from the scope of the invention as found in the appended claims and equivalents thereof.

What is claimed is:

1. A method of producing a label comprising:
   selecting media from a set of media of varying size, said media having a first side and a second side;
   feeding said media into a printing device;
   applying print imaging to a selected one of said first side and said second side; and
   applying an adhesive to a selected one of said first side and said second side wherein said adhesive is applied as taken from a reel-form stock, said reel-form stock comprising a first adhesive, a backing sheet, a second adhesive, and a carrier, said applying further including applying said first adhesive and said backing sheet to said media and collecting said second adhesive and said carrier on a take-up reel of said printing device.

2. A method of producing a label comprising:
   selecting media from a set of media of varying size, said media having a first side and a second side;
   feeding said media into a printing device;
   applying print imaging to said first side; and
   applying a first adhesive layer of an adhesive tape to said second side of the media, a backing sheet removably adhered to said first adhesive layer, a second adhesive layer removably adhered to the backing sheet opposite the first adhesive layer, and a carrier sheet adhered to said second adhesive layer opposite the backing sheet;
   wherein said first adhesive layer and said backing sheet of said adhesive tape include a plurality of segments.

3. A method of producing a label according to claim 2 wherein said adhesive tape includes complete cuts through said first adhesive layer and said backing sheet to define said segments, said segments being carried on said carrier sheet via said second adhesive layer.

4. A method of producing a label according to claim 2 wherein said adhesive tape is applied as taken from a reel-form stock.

5. A label-making printer comprising:
   a media feed path and transport mechanism propelling selected media through said printer;
   a printing device adjacent said feed path and applying print imaging to said media; and
   an adhesive station applying adhesive to said media, said adhesive station including a reel-form adhesive stock, said adhesive station applying said reel-form stock to said media, said reel-form stock including a first adhesive, a first backing sheet, a second adhesive, and a carrier wherein said adhesive station applies said first adhesive and said first backing sheet to media passing thereby, said second adhesive and said carrier being collected on a take-up reel of said adhesive station.

* * * * *